(12) United States Patent
Kim et al.

(10) Patent No.: US 9,891,875 B2
(45) Date of Patent: Feb. 13, 2018

(54) HOST DEVICE FOR TRANSMITTING PRINT DATA TO PRINTER AND METHOD OF RENDERING PRINT DATA VIA HOST DEVICE

(71) Applicant: S-PRINTING SOLUTION CO., LTD., Suwon-si, Gyeonggi-do (KR)

(72) Inventors: So-hye Kim, Seoul (KR); Joo-young Jung, Suwon (KR); Ho-jin Ahn, Suwon (KR); Yu-na Kim, Yongin (KR)

(73) Assignee: S-PRINTING SOLUTION CO., LTD., Suwon-si (KR)

( * ) Notice: Subject to any disclaimer, the term of this patent is extended or adjusted under 35 U.S.C. 154(b) by 0 days.

(21) Appl. No.: 14/849,766

(22) Filed: Sep. 10, 2015

(65) Prior Publication Data
US 2016/0077779 A1    Mar. 17, 2016

(30) Foreign Application Priority Data
Sep. 11, 2014    (KR) .......................... 10-2014-0120205

(51) Int. Cl.
  *H04N 1/60*    (2006.01)
  *G06F 3/12*    (2006.01)
  *H04N 1/64*    (2006.01)

(52) U.S. Cl.
  CPC .......... *G06F 3/1247* (2013.01); *G06F 3/1206* (2013.01); *G06F 3/128* (2013.01); *G06F 3/1292* (2013.01); *H04N 1/6008* (2013.01); *H04N 1/6072* (2013.01); *H04N 1/642* (2013.01); *H04N 2201/0025* (2013.01); *H04N 2201/0065* (2013.01); *H04N 2201/0082* (2013.01)

(58) Field of Classification Search
None
See application file for complete search history.

(56) References Cited

U.S. PATENT DOCUMENTS

| | | | | | |
|---|---|---|---|---|---|
| 5,822,465 | A | * | 10/1998 | Normile | G06T 9/008 375/E7.13 |
| 5,832,126 | A | * | 11/1998 | Tanaka | H04N 1/41 382/176 |
| 5,991,515 | A | * | 11/1999 | Fall | G06T 9/00 358/1.12 |
| 6,256,104 | B1 | * | 7/2001 | Rumph | G06F 3/1297 358/1.15 |
| 6,587,583 | B1 | * | 7/2003 | Kurzweil | G06T 9/00 358/462 |
| 6,778,291 | B1 | * | 8/2004 | Clouthier | H04N 19/12 358/1.15 |
| 6,853,466 | B1 | * | 2/2005 | Harada | G06K 15/02 358/1.9 |
| 6,992,671 | B1 | * | 1/2006 | Corona | G06T 9/20 345/467 |

(Continued)

*Primary Examiner* — Madelein Nguyen
(74) *Attorney, Agent, or Firm* — Staas & Halsey LLP

(57) ABSTRACT

A host device for transmitting print data to a printer is configured to generate bitmap image data by using the print data, to extract object attribute information from objects forming the print data, to convert the generated bitmap image data and the extracted object attribute information into a format of a printer command which is capable of being processed by the printer, and to transmit the converted bitmap image data and the converted object attribute information to the printer.

17 Claims, 12 Drawing Sheets

(56) References Cited

U.S. PATENT DOCUMENTS

| | | | | |
|---|---|---|---|---|
| 7,116,445 B2* | 10/2006 | Uchiyama | H04N 1/405 | 358/3.06 |
| 7,164,493 B1* | 1/2007 | Matsumoto | G06K 15/02 | 358/1.1 |
| 7,245,399 B2* | 7/2007 | Lapstun | B41J 2/0452 | 358/2.99 |
| 8,269,992 B2* | 9/2012 | Kawasaki | G06K 15/02 | 358/1.13 |
| 8,560,753 B1* | 10/2013 | Hobbs | G06F 3/1454 | 345/2.1 |
| 9,536,324 B1* | 1/2017 | Fram | G06T 9/00 | |
| 9,619,916 B2* | 4/2017 | Steinke | G06T 13/80 | |
| 9,800,882 B2* | 10/2017 | Fram | H04N 19/426 | |
| 2003/0043905 A1* | 3/2003 | Nakayama | H04N 1/411 | 375/240.04 |
| 2003/0202196 A1* | 10/2003 | Ooki | G06K 15/02 | 358/1.9 |
| 2004/0160619 A1* | 8/2004 | Oki | H04N 1/54 | 358/1.9 |
| 2004/0217956 A1* | 11/2004 | Besl | G06T 15/00 | 345/419 |
| 2004/0223188 A1 | 11/2004 | Toda | | |
| 2005/0007632 A1* | 1/2005 | Miyazaki | G06K 15/02 | 358/1.18 |
| 2005/0140694 A1* | 6/2005 | Subramanian | G06F 9/545 | 345/619 |
| 2005/0152596 A1* | 7/2005 | Walmsley | B41J 2/04505 | 382/162 |
| 2005/0244065 A1* | 11/2005 | Malvar | G06K 9/36 | 382/239 |
| 2006/0104528 A1* | 5/2006 | Tamura | H04N 19/60 | 382/239 |
| 2006/0132857 A1* | 6/2006 | Akashi | G06K 15/02 | 358/448 |
| 2007/0058875 A1* | 3/2007 | Tabata | H04N 1/41 | 382/239 |
| 2007/0206867 A1* | 9/2007 | Tamura | H04N 19/176 | 382/232 |
| 2009/0059247 A1* | 3/2009 | Kawasaki | G06K 15/02 | 358/1.8 |
| 2009/0129684 A1* | 5/2009 | Lee | H04N 1/413 | 382/232 |
| 2009/0244559 A1* | 10/2009 | Megawa | G06K 15/02 | 358/1.9 |
| 2009/0296157 A1* | 12/2009 | Misawa | H04N 1/6072 | 358/3.24 |
| 2010/0265525 A1* | 10/2010 | Hagiwara | G06T 9/00 | 358/1.9 |
| 2010/0306413 A1* | 12/2010 | Kamay | H04N 19/503 | 709/247 |
| 2012/0194842 A1* | 8/2012 | Ushiku | G06K 15/005 | 358/1.13 |
| 2012/0229664 A1* | 9/2012 | Solomon | H04N 5/23229 | 348/222.1 |
| 2013/0251256 A1* | 9/2013 | Deng | G06T 9/00 | 382/166 |
| 2013/0286044 A1 | 10/2013 | Puckett | | |
| 2014/0085314 A1* | 3/2014 | Steinke | G06F 3/14 | 345/473 |
| 2014/0095587 A1* | 4/2014 | Schult | G06F 3/1242 | 709/203 |
| 2014/0195921 A1* | 7/2014 | Grosz | G06F 3/1242 | 715/738 |
| 2014/0368868 A1* | 12/2014 | Park | G06F 3/125 | 358/1.15 |
| 2015/0002902 A1* | 1/2015 | Akiba | G06K 15/1815 | 358/2.1 |
| 2015/0036160 A1* | 2/2015 | Deng | G06K 15/1849 | 358/1.13 |
| 2015/0036162 A1* | 2/2015 | Belbin | G06K 15/1828 | 358/1.13 |
| 2015/0116782 A1* | 4/2015 | Bruwer | H04N 1/41 | 358/3.24 |
| 2017/0110093 A1* | 4/2017 | Stein | G09G 5/30 | |
| 2017/0215028 A1* | 7/2017 | Rhoads | H04W 4/005 | |

* cited by examiner

HOST DEVICE FOR TRANSMITTING PRINT DATA TO PRINTER AND METHOD OF RENDERING PRINT DATA VIA HOST DEVICE

CROSS-REFERENCE TO RELATED APPLICATION

This application claims the benefit of Korean Patent Application No. 10-2014-0120205, filed on Sep. 11, 2014, in the Korean Intellectual Property Office, the disclosure of which is incorporated herein in its entirety by reference.

BACKGROUND

1. Field

The present disclosure relates to a host device for transmitting print data to a printer and a method of rendering the print data via the host device.

2. Description of the Related Art

A printer prints print data received from a host device, such as a personal computer (PC) or a mobile terminal. The host device renders the print data and transmits the rendered print data to the printer so that the printer can process the received print data. However, the objects attributes of the rendered print data are lost and thus the rendered print data is all processed as an image.

SUMMARY

Provided are a host device for transmitting print data to a printer and a method of rendering the print data via the host device.

Provided is a non-transitory computer-readable recording medium having embodied thereon a computer program for executing the method of rendering the print data via the host device.

Additional aspects will be set forth in part in the description which follows and, in part, will be apparent from the description, or may be learned by practice of the presented exemplary embodiments.

According to an aspect of an exemplary embodiment, a host device configured to transmit print data to a printer includes: a bitmap image generator configured to generate bitmap image data based on the print data; an object attribute information extractor configured to extract object attribute information from objects forming the print data; a printer command generator configured to convert the generated bitmap image data and the extracted object attribute information into a format of a printer command capable of being processed by the printer; and a communicator configured to transmit the converted bitmap image data and the converted object attribute information to the printer.

The printer command generator may be further configured to determine a compression method of the bitmap image data based on the object attribute information mapped in the bitmap image data, to compress the bitmap image data based on the determined compression method, and to convert the compressed bitmap image data into the format of the printer command.

The printer command generator may be further configured to divide the bitmap image data into band units and to determine the compression method of the bitmap image data in the band units.

The printer command generator may be further configured to determine the compression method of the bitmap image data based on a value of a pixel included in the bitmap image data.

The object attribute information extractor may be further configured to extract the object attribute information in a pixel unit of the bitmap image so that the object attribute information is mapped with the bitmap image data.

The printer command generator may be further configured to compress the object attribute information via a lossless data compression method and to convert the compressed object attribute information into the format of the printer command capable of being processed by the printer.

The printer command generator may be further configured to convert the object attribute information into a format of a printer command language capable of being processed by the printer.

According to an aspect of another exemplary embodiment, a method of rendering print data via a host device includes: generating bitmap image data based on the print data; extracting object attribute information from objects forming the print data; converting the generated bitmap image data and the extracted object attribute information into a format of a printer command capable of being processed by a printer; and transmitting the converted bitmap image data and the converted object attribute information to the printer.

The generating of the printer command may include determining a compression method of the bitmap image data based on the object attribute information mapped in the bitmap image data, compressing the bitmap image data via the determined compression method, and converting the compressed bitmap image into the format of the printer command.

The determining of the compression method of the bitmap image data may include dividing the bitmap image data into band units and determining the compression method of the bitmap image data in the band units.

The determining of the compression method of the bitmap image data may include determining the compression method of the bitmap image data based on a value of a pixel included in the bitmap image data.

The extracting of the object attribute information may include extracting the object attribute information in a pixel unit of the bitmap image so that the object attribute information is mapped with the bitmap image data.

The generating of the printer command may include compressing the object attribute information via a lossless data compression method and converting the compressed object attribute information into the format of the printer command capable of being processed by the printer.

The converting of the object attribute information into the format of the printer command capable of being processed by the printer may include converting the object attribute information into a format of a printer command language which is capable of being processed by the printer.

According to an aspect of another exemplary embodiment, a non-transitory computer-readable recording medium having embodied thereon a computer program for executing the method of rendering print data via a host device is provided.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

The following description and the attached drawings are provided for better understanding of various embodiments of the present invention, and descriptions of techniques or structures related to various embodiments of the present invention which would be obvious to one of ordinary skill in the art will be omitted.

Figure 1:
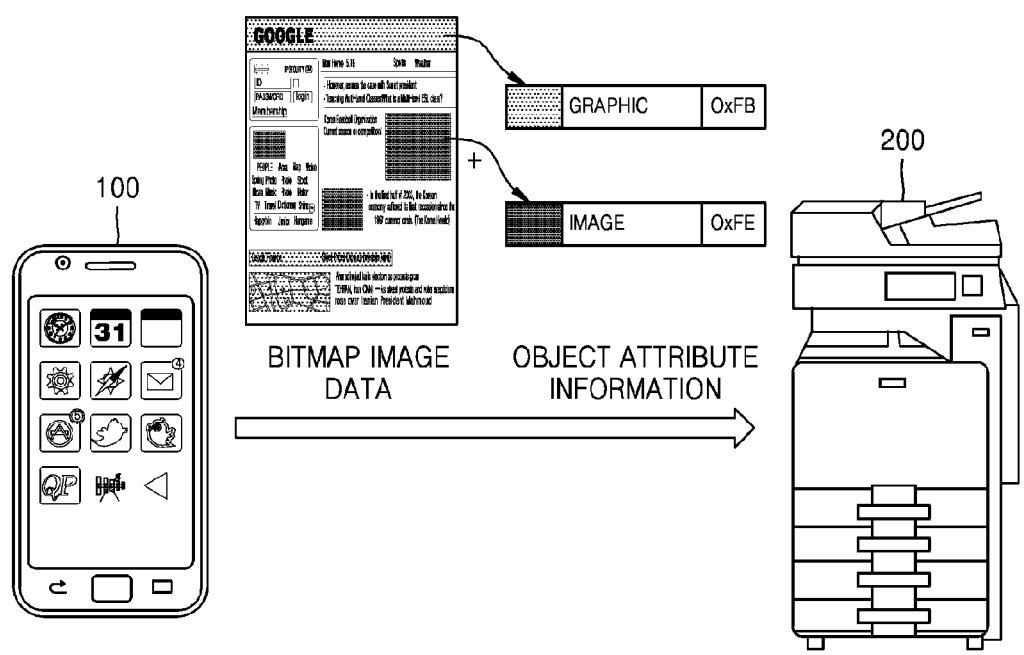
FIG. 1 is a view of a printer system according to an exemplary embodiment.

FIG. 1 is a view of a printer system according to an exemplary embodiment.

The printer system according to the present exemplary embodiment may include a host device 100 and a printer 200.

The host device 100 is a device for rendering print data and transmitting the print data to a printer and may be, for example, a cellular phone, a smart phone, a personal digital assistant (PDA), a portable multimedia player (PMP), a personal computer (PCs), a tablet PC, or the like.

The host device 100 may generate bitmap image data from the print data and extract object attribute information from objects forming the print data. The host device 100 may convert the generated bitmap image data and the extracted object attribute information into a format of a printer command capable of being processed by the printer 200. The host device 100 may transmit the converted bitmap image data and the converted object attribute information to the printer 200.

The printer 200 may be a printer which prints print data received from an external device or a multifunction printer (MFP) which has various functions such as printing, scanning, copying, faxing, server function, and web browsing.

The printer 200 receives from the host device 100 the bitmap image data and the object attribute information which are converted into the format of the printer command.

The printer 200 interprets the received bitmap image data and the received object attribute information which are in the format of the printer command, and obtains bitmap image data and object attribute information in a binary data format. The printer 200 converts RGB color data forming the obtained bitmap image data into CMYK color data, by using the object attribute information. The printer 200 may apply an algorithm for quality improvement to the converted bitmap image data, by using the object attribute information.

Figure 2:
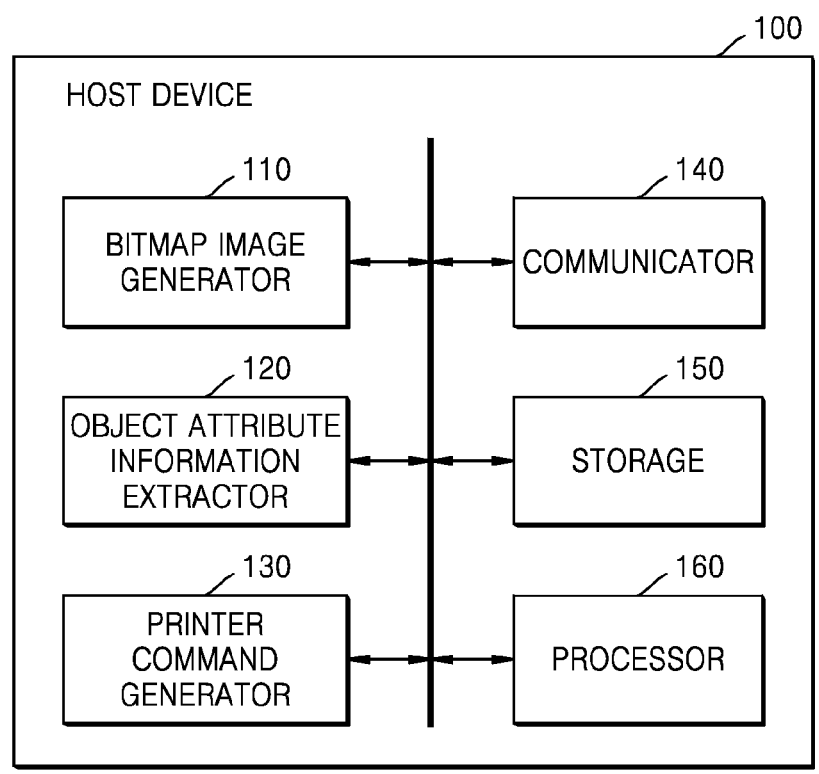
FIG. 2 is a block diagram of hardware components of a host device according to an exemplary embodiment.

FIG. 2 is a block diagram of hardware components of the host device 100.

The host device 100 according to an exemplary embodiment includes a bitmap image generator 110, an object attribute information extractor 120, a printer command generator 130, a communicator 140, a storage 150, and a processor 160.

The bitmap image generator 110 generates bitmap image data by using print data. In detail, when a print request is received, the bitmap image generator 110 may generate the bitmap image data by converting the print data into an image of a bitmap format.

The image of the bitmap format is a set of pixels, each of which is the smallest unit having one color value. For example, the image of the bitmap format may have one color value formed of 3 bytes, with respect to each pixel, and a set of color values with respect to the pixels may be the bitmap image data.

The object attribute information extractor 120 extracts object attribute information from objects forming the print data.

The objects denote objects of printing which form the print data, such as pictures, letters, figures, etc. The object attribute information denotes information indicating attributes of the objects. For example, the object attribute information may be a background object, an image object, a text object, a graphic object, etc.

The object attribute information extractor 120 may determine the attributes of the objects forming the print data by interpreting the print data, and extract the object attribute information based on a result of the determination.

The object attribute information extractor 120 may extract the object attribute information in a pixel unit of a bitmap image so that the object attribute information is mapped with the bitmap image data. For example, the object attribute information extractor 120 may indicate the object attribute information as a value of one byte, with respect to one pixel of the bitmap image.

The printer command generator 130 converts the generated bitmap image data into a format of a printer command which is capable of being processed by the printer 200.

The printer command is in a language format which is capable of being processed by the printer 200. For example, the printer command may be a printer command language (PCL), a postscript (PS), etc.

The printer command generator 130 may convert the extracted object attribute information into the format of the printer command which is capable of being processed by the printer 200. For example, the printer command generator 130 may convert the object attribute information into a format of the PCL.

The printer command generator 130 may compress the generated bitmap image data and convert the compressed bitmap image data into the format of the printer command. In detail, the printer command generator 130 may determine a compression method of the bitmap image data, by using the object attribute information which is extracted and mapped in the bitmap image data. The printer command generator 130 may determine the compression method of the bitmap image data by using the object attribute information in which the background object is excluded.

For example, the printer command generator 130 may determine the compression method of the bitmap image data as any one of a lossless data compression method and a loss data compression method, by using the object attribute information. The printer command generator 130 may compress the bitmap image data based on the determined compression method.

The lossless data compression is a compression method by which data before compression is the same as data after decompression. The lossless data compression is used when a compression rate is low and it is more important to increase the accuracy of data than to increase the compression rate of data. For example, a DELTAROW method is the lossless data compression method. The loss data compression is a method by which data before compression is not the same as data after decompression. The loss data compression is used when a compression rate is high and it is more important to increase the compression rate of data than to increase the accuracy of data. For example, a JPEG method is the loss data compression method.

In addition, according to a degree of loss, the loss data compression method may be divided into a low image quality loss data compression method by which a compression rate is high and a degree of data loss is high, and a high image quality loss data compression method by which a compression rate is relatively low and a degree of data loss is relatively low.

The printer command generator 130 may compress the bitmap image data according to the lossless data compression method, when only a text object exists in the print data. The printer command generator 130 may compress the bitmap image data according to the loss data compression when other objects than the text object exist in the print data.

Also, the printer command generator 130 may compress the bitmap image data according to the high image quality loss data compression method by which the degree of data loss is low, when only an image object exists in the print data. The printer command generator 130 may compress the bitmap image data according to the low image quality loss data compression method by which the degree of data loss is high, when other objects than the image object exist in the print data.

The printer command generator 130 may determine the compression method of the bitmap image data by using values of pixels included in the bitmap image data. The printer command generator 130 may determine the compression method of the bitmap image data by using the values of the pixels included in the bitmap image data, when the object attribute information mapped in the bitmap image data has at least one type of object attribute information.

In detail, the printer command generator 130 may determine the compression method of the bitmap image data according to a degree of variance and a degree of change of the values of the pixels included in the bitmap image data.

For example, the printer command generator 130 may calculate the number of colors used, by enumerating the values of the pixels included in the bitmap image data. When the number of colors used is equal to or greater than a predetermined value, the printer command generator 130 may compress the bitmap image data according to the loss data compression method by which the degree of data loss is high. When the number of colors used is less than the predetermined value, the printer command generator 130 may compress the bitmap image data according to the loss data compression method by which the degree of data loss is low.

For example, as a gradient value indicating the degree of change of the values of the pixels included in the bitmap image data is greater, the printer command generator 130 uses the loss data compression method having a higher degree of data loss. The gradient value is a difference value between values of adjacent pixels. The closer colors of the adjacent pixels are to each other, the smaller the gradient value is.

The printer command generator 130 may calculate the gradient value between pixels included in the bitmap image data. When the gradient value is equal to or higher than a predetermined value, the printer command generator 130 may compress the bitmap image data according to the loss data compression method by which the degree of data loss is high. When the gradient value is less than the predetermined value, the printer command generator 130 may compress the bitmap image data according to the loss data compression method by which the degree of data loss is low.

The printer command generator 130 may divide the bitmap image data into band units, and may determine the compression method of the bitmap image data in the band units.

A band is a unit which is predetermined in order to process print data by dividing the print data into data of small sizes. The band unit may be set based on a band height. For example, the band height may be set as 128 pixels.

The printer command generator 130 may determine the compression method of the bitmap image data in the band, by using the object attribute information mapped in pixels included in the band. Also, the printer command generator 130 may determine the compression method of the bitmap image data in the band, by using values of the pixels included in the band.

The printer command generator 130 may compress the extracted object attribute information and convert the compressed object attribute information into the format of the printer command. For example, the printer command generator 130 may compress the object attribute information according to the lossless data compression method in order to prevent the loss of data.

The communicator 140 is configured to exchange data with an external device via wired/wireless communication. The communicator 140 transmits the bitmap image data that is converted into the format of the printer command to the printer 200. Also, the communicator 140 transmits the object attribute information that is converted into the format of the printer command to the printer 200.

The storage 150 is configured to store data, and may include, for example, volatile memory, such as random access memory (RAM), non-volatile memory, such as read only memory (ROM), hard disk drive (HDD), or solid state drive (SSD).

The storage 150 may store the generated bitmap image data and the extracted object attribute information by mapping the generated bitmap image data and the extracted object attribute information. For example, the storage 150 may store the bitmap image data indicated as 3 bytes with respect to one pixel of the bitmap image, and the object attribute information indicated as one bye with respect to one pixel of the bitmap image, by mapping the bitmap image data and the object attribute information.

The processor 160 is configured to process overall operations of the host device 100, and may include, for example, a central processing unit (CPU).

FIG. 3 is a view for describing a process of extracting the object attribute information included in the print data, according to an exemplary embodiment.

Figure 3A:
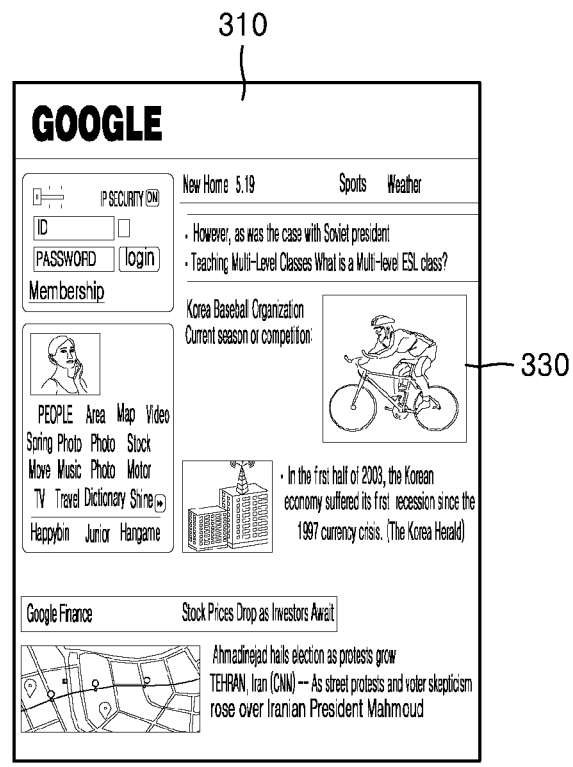
FIGS. 3A, 3B and 3C are views for describing a process of extracting object attribute information included in print data, according to an exemplary embodiment.

FIG. 3A is a view of the print data which is the object of printing. The print data may include objects, such as letters, figures, and pictures.

Figure 3B:
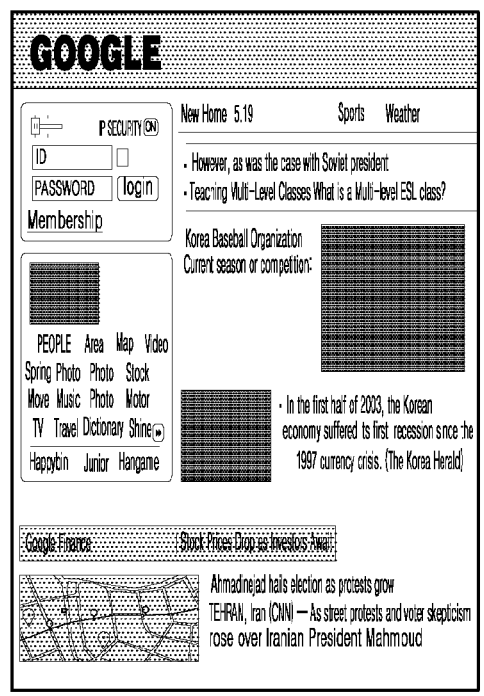

FIG. 3B is a view of the object attribute information extracted according to attributes of the objects in the print data. The object attribute information may be, for example, a background object, an image object, a text object, and a graphic object. However, the object attribute information is not limited thereto, and may be various objects.

For example, when the object is a photo or a picture, the object attribute information of pixels included in the object may be the image object. When the object is a letter, the object attribute information of pixels included in the object may be the text object. When the object is a figure, a table, or a chart, the object attribute information of pixels included in the object may be the graphic object. When there is no object, the object attribute information of pixels included in a portion where the object does not exist may be the background object.

Figure 3C:
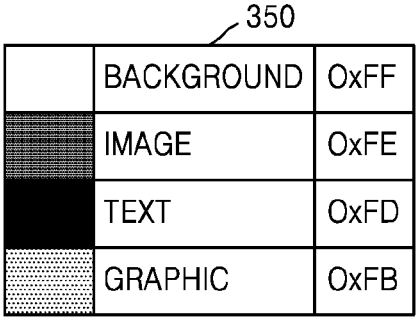

FIG. 3C is an object attribute information classified table 350 for indicating the object attribute information of the objects in the print data of FIG. 3B.

The object attribute information of each pixel may be indicated as a value of one byte. For example, a value of the object attribute information with respect to the background object may be 0xFF. A value of the object attribute information with respect to the image object may be 0xFE. A value of the object attribute information with respect to the text object may be 0xFD. A value of the object attribute information with respect to the graphic object may be 0xFB. However, values of the object attribute information are not limited thereto, and may vary.

Referring to an object 310 in the print data, when any one of pixels included in the object 310 includes a black color, a value of the bitmap image data of the pixel may be 0xFFFFFF corresponding to the black color. Also, since the object 310 corresponds to a figure, the object attribute information of the pixels included in the object 310 may be the graphic object and a value of the object attribute information may be 0xFB.

Referring to an object 330 in the print data, when any one of pixels included in the object 330 includes a black color, a value of the bitmap image data of the pixel may be 0xFFFFFF corresponding to the black color. Since the object 330 corresponds to a photo, the object attribute information of the pixel included in the object 330 may be the image object and a value of the object attribute information may be 0xFE.

Figure 4:
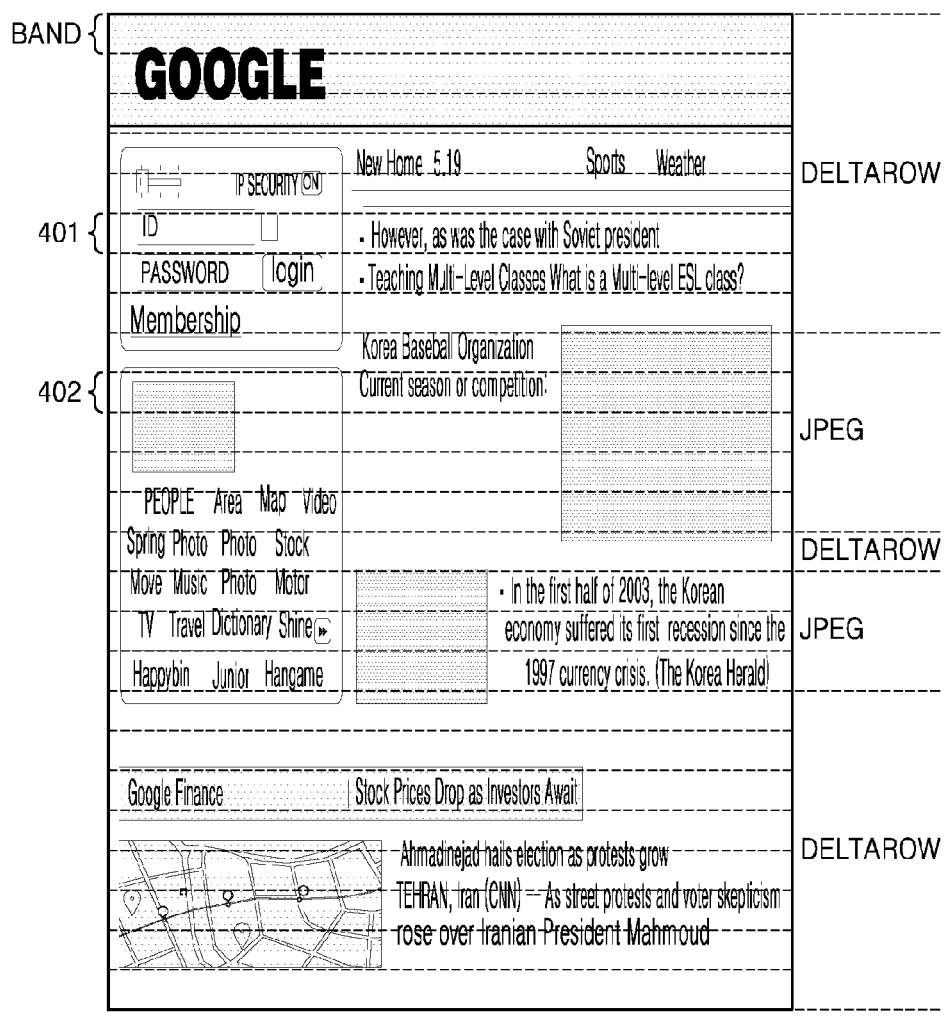
FIG. 4 is a view for describing a process of determining a compression method of bitmap image data, according to an exemplary embodiment.

FIG. 4 is a view for describing a process of determining the compression method of the bitmap image data, according to an exemplary embodiment.

The host device 100 may compress the bitmap image data and convert the compressed bitmap image data into the format of the printer command. The host device 100 may divide the bitmap image data into band units and determine the compression method of the bitmap image data in the band units.

A band is a unit which is predetermined in order to process print data by dividing the print data into data of small sizes. The band unit may be set based on a band height. For example, the band height may be set as 128 pixels.

Referring to a band 401 of FIG. 4, it is assumed that a portion of the print data, the portion corresponding to the band 401, includes a text object and a background in which objects are not included.

The host device 100 may divide the bitmap image data into band units and obtain the bitmap image data included in the band 401.

The host device 100 may obtain the object attribute information mapped in the bitmap image data included in the band 401.

The host device 100 may determine the compression method of the bitmap image data included in the band 401, by using the obtained object attribute information. When determining the compression method, the host device 100 may use the object attribute information in which the background object is excluded.

When all of the object attribute information corresponding to the band 401 is the text object, the host device 100 may compress the bitmap image data included in the band 401 according to the lossless data compression method.

Referring to the band 401, when all of the values of the object attribute information corresponding to the band 401 is 0xFD, the host device 100 may determine that only the text object exists in the band 401, and may compress the bitmap image data included in the band 401 according to the DELTAROW method, which is the lossless data compression method.

Referring to a band 402 of FIG. 4, it is assumed that a portion of the print data, the portion corresponding to the band 402, includes a text object, an image object, and a background in which objects do not exist.

The host device 100 may divide the bitmap image data into band units and may obtain the bitmap image data included in the band 402.

The host device 100 may obtain the object attribute information mapped in the bitmap image data included in the band 402.

The host device 100 may determine the compression method of the bitmap image data included in the band 402, by using the obtained object attribute information.

When other objects than the text object exist in the band 402, the host device 100 may compress the bitmap image data included in the band 402 according to the loss data compression method. In more detail, when all of the object attribute information corresponding to the band 402 is the image object, the host device 100 may compress the bitmap image data included in the band 402 according to the low image quality loss data compression method by which the degree of data loss is high. When other objects in addition to the image object exist in the band 402, the host device 100 may compress the bitmap image data included in the band 402 according to the high image quality loss data compression method by which the degree of data loss is low.

Referring to the band 402, since the value of 0xFD and the value of 0xFE exist in the object attribute information corresponding to the band 402, the host device 100 may determine that the text object and the image object exist in the band 402 and may compress the bitmap image data included in the band 402 according to the high image quality loss data compression method.

Also, when the object attribute information mapped in the bitmap image data included in the band 402 has at least one type of object attribute information, the host device 100 may determine the compression method of the bitmap image data in the band 402, by using values of pixels included in the bitmap image data included in the band 402.

The host device 100 may compress the bitmap image data according to the compression method having a higher degree of data loss, as the values of the pixels included in the bitmap image data in the band 402 are more diverse. For example, when the number of colors used, which is calculated by enumerating the values of the pixels included in the band 402, is equal to or greater than a predetermined value, the host device 100 may compress the bitmap image data according to the loss data compression method by which the degree of data loss is high. When the number of colors used, which is calculated by enumerating the values of the pixels included in the band 402, is less than the predetermined value, the host device 100 may compress the bitmap image data according to the loss data compression method by which the degree of data loss is low.

Alternatively, as a gradient value of the pixels included in the bitmap image data in the band 402 is greater, the host device 100 may compress the bitmap image data according to the compression method having a higher degree of data loss. The gradient value is a difference value between values of adjacent pixels. The closer colors of the adjacent pixels are to each other, the smaller the gradient value is.

For example, the host device 100 may calculate gradient values between the pixels included the band 402. When the gradient value is equal to or higher than a predetermined value, the host device 100 may compress the bitmap image data according to the loss data compression method by which the degree of data loss is high. When the gradient value is less than the predetermined value, the host device 100 may compress the bitmap image data according to the loss data compression method by which the degree of data loss is low.

Figure 5:
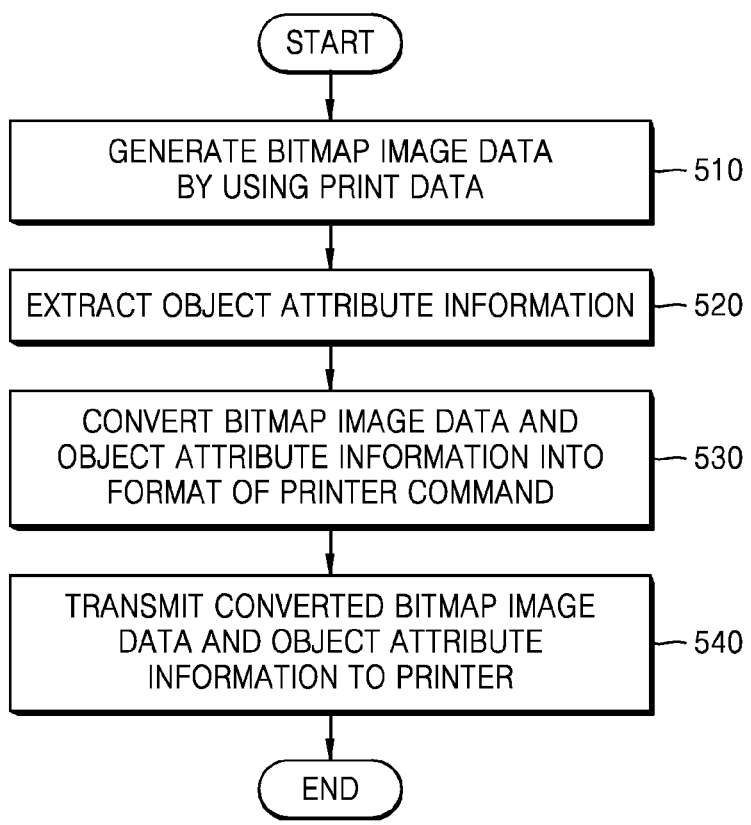
FIG. 5 is a flowchart of a method of rendering print data via a host device, according to an exemplary embodiment.

FIG. 5 is a flowchart of a method of rendering the print data via the host device 100, according to an exemplary embodiment.

In operation S510, the host device 100 generates the bitmap image data by using the print data. For example, the host device 100 may generate the bitmap image data by converting the print data into an image of a bitmap image format.

In operation S520, the host device 100 extracts the object attribute information from objects forming the print data. For example, the host device 100 may extract the object attribute information in a pixel unit of the bitmap image so that the object attribute information is mapped with the bitmap image data.

In operation S530, the host device 100 converts the generated bitmap image data and the extracted object attribute information into a format of a printer command which is capable of being processed by the printer 200.

The host device 100 may compress the generated bitmap image data and convert the compressed bitmap image data into the format of the printer command. For example, the host device 100 may determine the compression method of the bitmap image data by using the extracted object attribute information. Also, the host device 100 may determine the compression method of the bitmap image data by using values of pixels included in the bitmap image data. The host device 100 may compress the bitmap image data according to the determined compression method.

The host device 100 may divide the bitmap image data in band units and determine the compression method of the bitmap image data in the band units. The host device 100 may determine the compression method of the bitmap image data in the band, by using the object attribute information mapped in the bitmap image data in the band. Alternatively, the host device 100 may determine the compression method of the bitmap image data in the band, by using the values of the pixels included in the bitmap image data in the band.

The host device 100 may compress the extracted object attribute information and convert the compressed object attribute information into the format of the printer command. For example, the host device 100 may compress the object attribute information according to the lossless data compression method in order to prevent the loss of data.

In operation S540, the host device 100 transmits the converted bitmap image data and the converted object attribute information to the printer 200.

Figure 6:
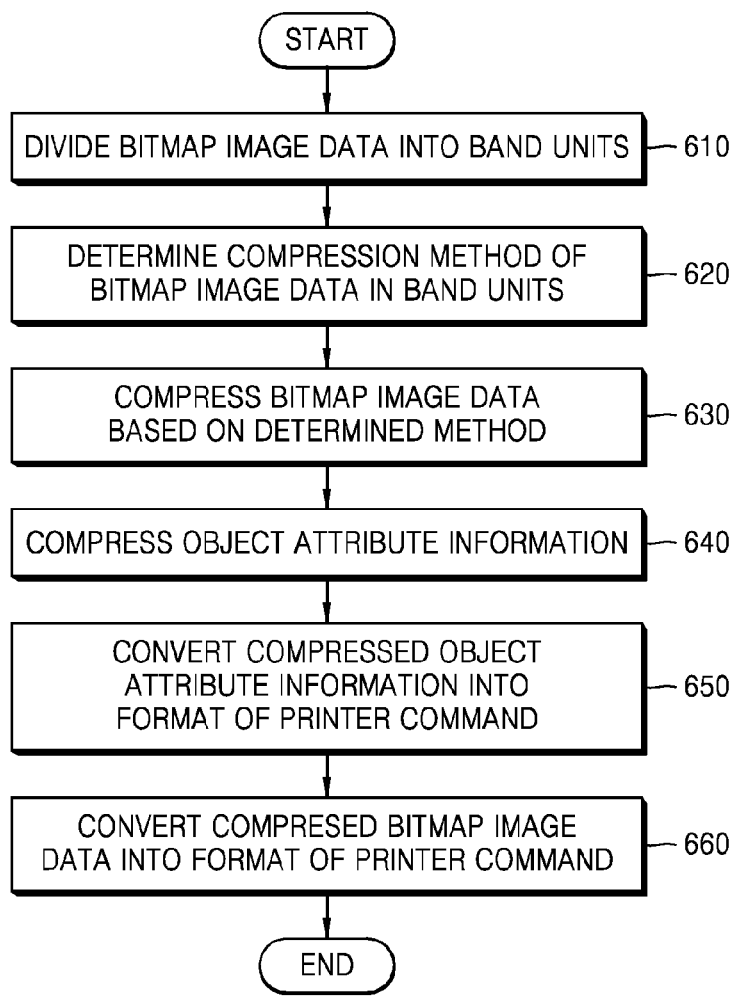
FIG. 6 is a flowchart of a process of converting print data into a format of a printer command capable of being processed by a printer, the process being performed by a host device, according to an exemplary embodiment.

FIG. 6 is a flowchart of a process of converting the print data into the format of the printer command which is capable of being processed by the printer 200, the process being performed by the host device 100, according to an exemplary embodiment.

In operation S610, the host device 100 divides the bitmap image data into band units. A band is a unit which is predetermined in order to process print data by dividing the print data into data of small sizes. The band unit may be set based on a band height. For example, the band height may be set as 128 pixels.

In operation S620, the host device 100 determines the compression method of the bitmap image data in the band units. The host device 100 may set a different compression method for the bitmap image data in each band. The host device 100 may determine the compression method of the bitmap image data in the band, by using the object attribute information mapped in the bitmap image data in the band. Also, the host device 100 may determine the compression method of the bitmap image data in the band, by using values of pixels included in the bitmap image data in the band.

In operation S630, the host device 100 compresses the bitmap image data in each band according to the determined compression method.

In operation S640, the host device 100 compresses the object attribute information. For example, the host device 100 may compress the object attribute information according to the lossless data compression method in order to prevent the loss of data.

In operation S650, the host device 100 converts the compressed object attribute information into the format of the printer command which is capable of being processed by the printer 200. For example, the host device 100 may convert the object attribute information into the format of the PCL.

In operation S660, the host device 100 converts the compressed bitmap image data into the format of the printer command.

Figure 7:
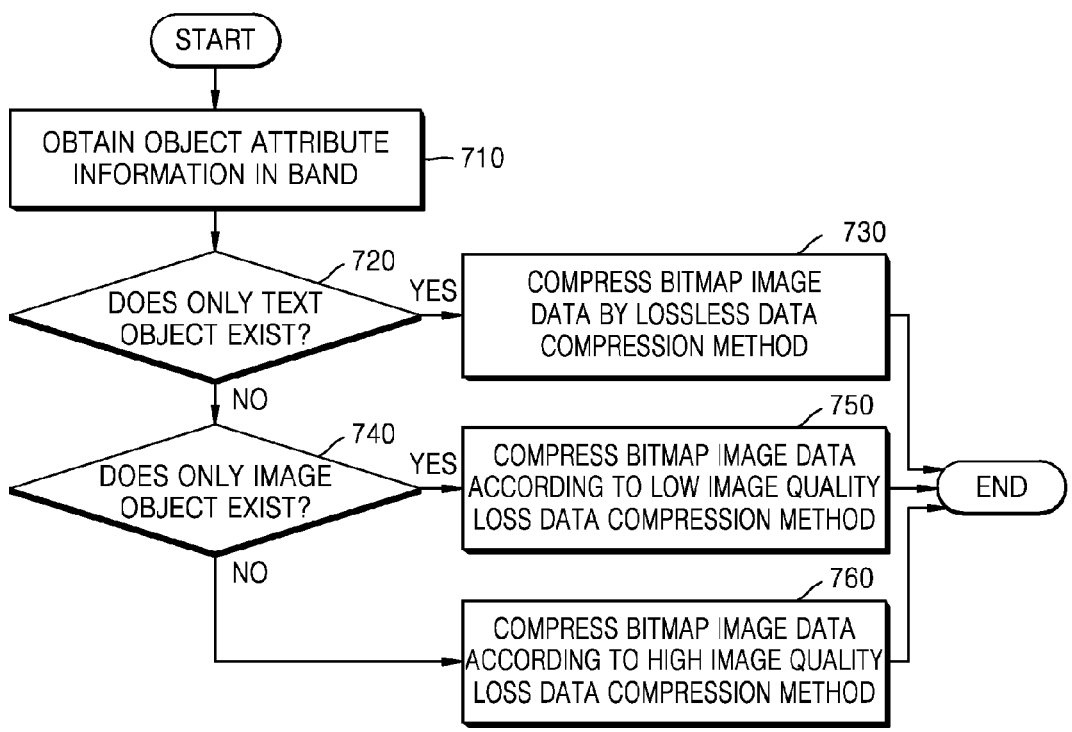
FIG. 7 is a flowchart of a process of determining a compression method of bit map image data, according to an exemplary embodiment.

FIG. 7 is a flowchart of a process of determining the compression method of the bitmap image data, according to an exemplary embodiment.

FIG. 7 illustrates the process of determining the compression method of the bitmap image data in any one band, from among the bitmap image data divided into the band units.

In operation S710, the host device 100 obtains the object attribute information mapped in pixels included in the divided bands.

In operation S720, the host device 100 interprets the obtained object attribute information and determines whether only a text object exists in the print data. For example, the host device 100 determines whether all values of the obtained object attribute information are 0xFD. When the host device 100 uses the object attribute information to determine whether only the text object exists in the print data, the host device 100 may exclude the background object.

In operation S730, when the host device 100 determines that only the text object exists in the print data, the host device 100 may compress the bitmap image data according to the lossless data compression method.

In operation S740, when other objects than the text object exist in the print data, the host device 100 determines whether only an image object exists in the print data. For example, the host device 100 determines whether all values of the obtained object attribute information are 0xFE.

In operation S750, when it is determined that only the image object exists in the print data, the host device 100 may compress the bitmap image data according to the low image quality loss data compression method.

In operation S760, when it is determined that other objects than the image object exist in the print data, the host device 100 may compress the bitmap image data according to the high image quality loss data compression method.

When the object attribute information has at least one type of object attribute information, the host device 100 may determine the compression method of the bitmap image by further dividing the at least one type of object attribute information based on a degree of data loss. For example, the host device 100 may determine the compression method of the bitmap image data by using the values of the pixels included in the bitmap image data.

The host device 100 may compress the bitmap image data according to the loss data compression method having a higher degree of data loss, as the values of the pixels included in the print data are more diverse. In detail, the host device 100 may calculate the number of colors used in the print data, by enumerating the values of the pixels included in the bitmap image data. When the number of colors is equal to or greater than a predetermined value, the host device 100 may compress the bitmap image data according to the loss data compression method by which the degree of data loss is high. When the number of colors is less than the predetermined value, the host device 100 may compress the bitmap image data according to the loss data compression method by which the degree of data loss is low.

As a gradient value of the pixels is greater, the host device 100 may compress the bitmap image data according to the loss data compression method having a higher degree of data loss. The gradient value is a difference value between values of adjacent pixels. The closer colors of the adjacent pixels are to each other, the smaller the gradient value is. For example, the host device 100 may calculate gradient values between the pixels included in the band. When the gradient value is equal to or higher than a predetermined value, the host device 100 may compress the bitmap image data according to the loss data compression method by which the degree of data loss is high. When the gradient value is less than the predetermined value, the host device 100 may compress the bitmap image data according to the loss data compression method by which the degree of data loss is low.

Figure 8:
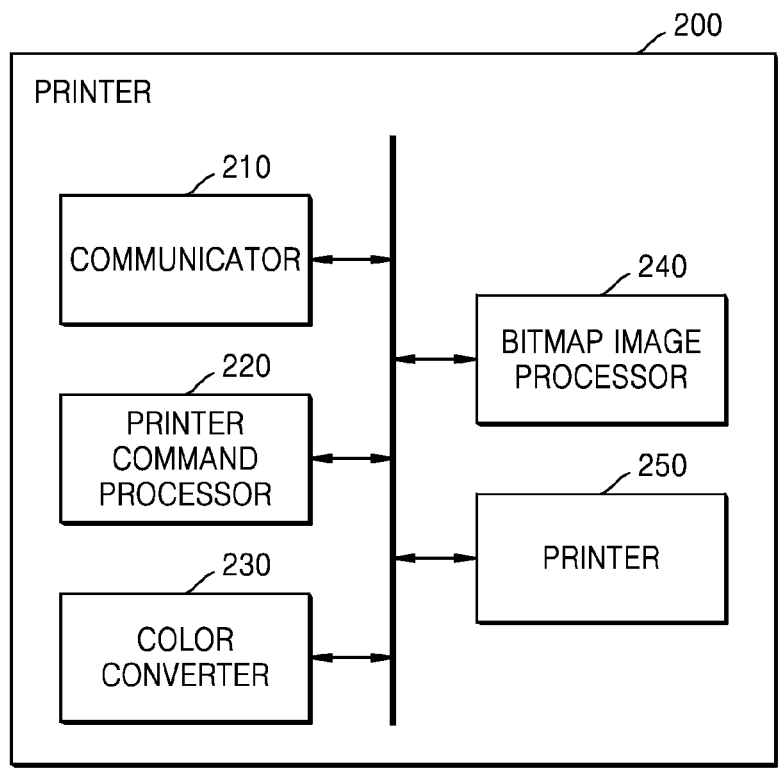
FIG. 8 is a block diagram of hardware components of a printer according to an exemplary embodiment.

FIG. 8 is a block diagram of hardware components of the printer 200 according to an exemplary embodiment.

The printer 200 according to the present exemplary embodiment includes a communicator 210, a printer command processor 220, a color converter 230, a bitmap image processor 240, and a printer 250.

The communicator 210 is configured to exchange data with an external device via wired/wireless communication. The communicator 210 receives from the host device 100 bitmap image data and object attribute information which are converted into a format of a printer command.

The printer command processor 220 interprets the received bitmap image data and the received object attribute information in the format of the printer command, and obtains bitmap image data and object attribute information in a binary data format. For example, the printer command processor 220 may interpret the bitmap image data and the object attribute information in the format of the printer command and obtain the bitmap image data and object attribute information mapped in the bitmap image data.

For example, the printer command processor 220 may obtain a value of one color formed of 3 bytes indicating the bitmap image data and a value of the object attribute information formed of one byte indicating the object attribute information with respect to each pixel forming the bitmap image by mapping the value of one color formed of 3 bytes indicating the bitmap image data and the value of the object attribute information formed of one byte indicating the object attribute information.

The color converter 230 performs color conversion on the bitmap image data by using the object attribute information.

The color conversion is a conversion of standard color data forming the bitmap image data into output color data. The color converter 230 may convert RGB color data which is mainly used in print data for screen, which is the standard color data, into CMYK color data which is mainly used in print data for output, which is the output color data, with reference to a look-up table (LUT).

In detail, the color converter 230 may divide the obtained bitmap image data based on the obtained object attribute information, and may perform color conversion on each of the divided bitmap image data. For example, the color converter 230 may divide the bitmap image data into image object data, text object data, and graphic object data, based on the object attribute information.

The color converter 230 may convert each of the divided bitmap image data by referring to different LUTs according to the object attribute information. For example, the color converter 230 may determine the LUT that is to be referred to when converting each of the divided bitmap image data, according to the object attribute information. The color converter 230 may convert the standard color data of each of the bitmap image data into the output color data, with reference to the determined LUT.

The bitmap image processor 240 may selectively apply an algorithm for quality improvement to the color-converted bitmap image data, by using the object attribute information. In detail, the bitmap image processor 240 may select the bitmap image data to which the algorithm for quality improvement is to be applied, from among the divided bitmap image data, by using the object attribute information. The bitmap image processor 240 may apply the algorithm for quality improvement to only the selected bitmap image data.

For example, the bitmap image processor 240 may select the text object data and the graphic object data from among the divided bitmap image data, by referring to the object attribute information, and may apply an algorithm for improving sharpness of an edge portion to only the text object data and the graphic object data. Also, the bitmap image processor 240 may apply an algorithm for reducing a white gap with respect to the background to only the text object data and the graphic object data, by referring to the object attribute information.

The bitmap image processor 240 may obtain the bitmap image data formed of the output color data, by integrating each of the divided bitmap image data, and may generate print data in a page unit by using the bitmap image data.

The printer 250 prints the print data in a print paper.

Figure 9:
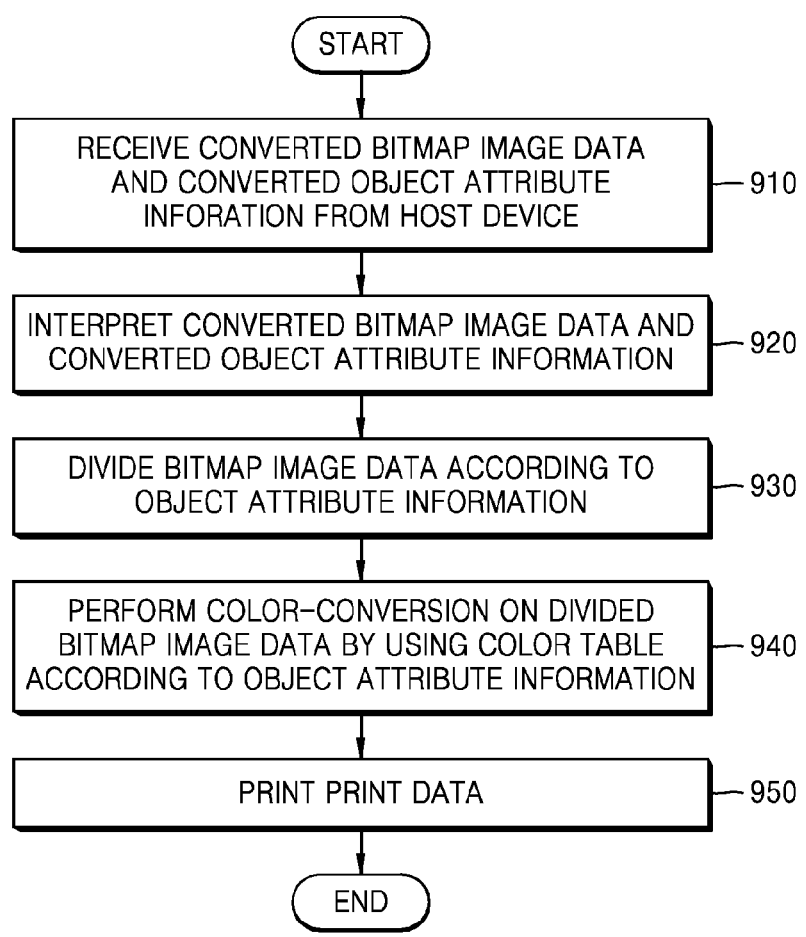
FIG. 9 is a flowchart of a process of printing print data via a printer, according to an exemplary embodiment.

FIG. 9 is a flowchart of a process of printing the print data via the printer 200, according to an exemplary embodiment.

In operation S910, the printer 200 receives the bitmap image data and the object attribute information which are converted into the format of the printer command, from the host device 100.

In operation S920, the printer 200 interprets the received bitmap image data and object attribute information in the format of the printer command, to obtain the bitmap image data and the object attribute information in a binary data format.

In operation S930, the printer 200 divides the obtained bitmap image data according to the obtained object attribute information. For example, the printer 200 may divide the bitmap image data into image object data, text object data, and graphic object data, according to the object attribute information.

In operation S940, the printer 200 converts the standard color data forming the bitmap image data into the output color data, by using the object attribute information.

The printer 200 may convert each of the divided bitmap image data by referring to different LUTs according to the object attribute information. For example, the printer 200 may determine the LUT that is to be referred to when converting each of the divided bitmap image data, according to the object attribute information. The printer 200 may convert the standard color data of each of the divided bitmap image data into the output color data, by referring to the determined LUT.

Also, the printer 200 may apply an algorithm for quality improvement to the bitmap image data on which the color conversion is performed, by using the object attribute information. The printer 200 may select the bitmap image data to which the algorithm for quality improvement is to be applied, from among the divided bitmap image data, by using the object attribute information.

For example, the printer 200 may apply an algorithm for improving a sharpness of an edge portion to only the text object data and the graphic object data. Also, the printer 200 may apply an algorithm for reducing a white gap with respect to a background to only the text object data and the graphic object data.

The printer 200 may obtain the bitmap image data formed of the output color data by integrating each of the divided bitmap image data, and may generate the print data in a page unit by using the bitmap image data.

In operation S950, the printer 200 prints the print data.

Figure 10:
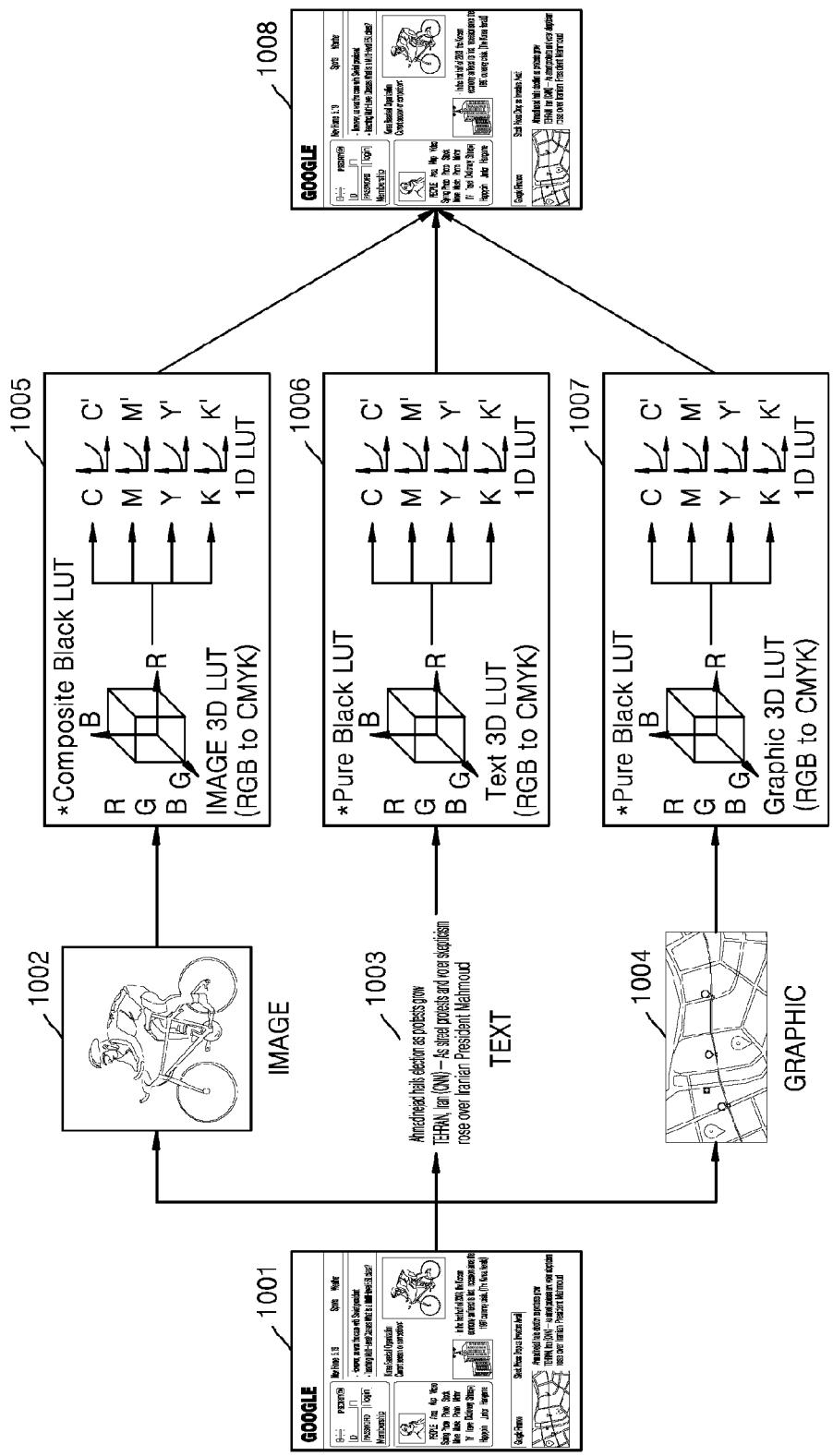
FIG. 10 is a view for describing a process of performing color-conversion on print data via a printer, according to an exemplary embodiment.

FIG. 10 is a view for describing a process of performing color conversion on the print data, via the printer 200, according to an exemplary embodiment.

The printer 200 according to the present exemplary embodiment color-converts the standard color data forming the bitmap image data into the output color data, by using the object attribute information. For example, the printer 200 may convert RGB color data 1001 mainly used in print data for screen into CMYK color data 1008 mainly used in print data for outputting, by using the object attribute information. The printer 200 may convert the RGB color data 1001 into the CMYK color data 1008 by referring to the LUT.

The printer 200 may divide the RGB color data 1001 forming the bitmap image data, according to the object attribute information. For example, the printer 200 may divide the RGB color data 1001 into image object data 1002, text object data 1003, and graphic object data 1004.

The printer 200 may convert each of the divided data 1002, 1003, and 1004, by referring to each different LUT 1005, 1006, or 1007, according to the object attribute information. For example, when the printer 200 converts the RGB color data having a value of a black color, the printer 200 may refer to a composite black LUT representing the black color by mixing cyan C, magenta M, yellow Y, and black K, or a pure black LUT representing the black color by using only K.

The printer 200 may convert the image object 1002 by referring to the composite black LUT 1005, and may convert the text object data 1003 and the graphic object data 1004 by referring to the pure lack LUT 1006 and 1007.

The printer 200 may obtain CMYK color data 1008 by integrating each of the divided and converted data.

As described above, according to the one or more of the above exemplary embodiments, the host device configured to transmit the print data to the printer determines the compression method of the bitmap image data by using the extracted object attribute information, and thus, printing qualities may be improved while sizes of data may be reduced. Also, since the host device extracts the object attribute information and transmits to the printer the print data together with the object attribute information, the printer may use the object attribute information to improve the print quality.

Various embodiments may be embodied in a general purpose digital computer by running a program from a computer-readable medium. Examples of the computer-readable medium include storage media such as magnetic storage media (e.g., read only memories (ROMs), floppy discs, or hard discs), optically readable media (e.g., compact disk-read only memories (CD-ROMs), or digital versatile disks (DVDs)), etc.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A host device comprising:
   a controller configured to:
      generate bitmap image data based on print data;
      extract object attribute information from objects forming the print data;
      determine a compression method of the bitmap image data based on the extracted object attribute information that corresponds to the bitmap image data from among a lossless data compression method, a low image quality loss data compression method, and a high image quality loss data compression method;
      compress the bitmap image data using the determined compression method;
      convert the compressed bitmap image data and the extracted object attribute information into a format of a printer command to be processed by a printer; and
   a communicator configured to transmit the converted, compressed bitmap image data and the converted object attribute information to the printer.

2. The host device of claim 1, wherein
   the controller is further configured to:
      map the extracted object attribute information with the corresponding bitmap image data.

3. The host device of claim 2, wherein the controller is further configured
   to divide the bitmap image data into band units to map the extracted object attribute information with the bitmap image data, and
   to determine the compression method of the bitmap image data in the band units.

4. The host device of claim 2, wherein the controller is further configured to determine the compression method of the bitmap image data based on a value of a pixel included in the bitmap image data.

5. The host device of claim 1, wherein
the bitmap image data is data of a bitmap image, and
the controller is further configured to extract the object attribute information in a pixel unit of the bitmap image and map the object attribute information in the pixel unit of the bitmap image with the bitmap image data.

6. The host device of claim 1, wherein
the controller is further configured to compress the extracted object attribute information via the lossless data compression method and to convert the compressed object attribute information into the format of the printer command to be processed by the printer, and
the communicator is further configured to transmit the converted, compressed object attribute information to the printer.

7. The host device of claim 1, wherein the controller is further configured to convert the extracted object attribute information into a format of a printer command language to be processed by the printer.

8. The host device of claim 1,
wherein when text objects are included in the extracted object attribute information, the lossless data compression method is determined as the compression method,
when image objects are included in the extracted object attribute information, the low image quality loss data compression method is determined as the compression method, and
when at least one of a combination of objects and other objects other than text objects and image objects are included in the extracted object attribute information, the high image quality loss data compression method is determined as the compression method.

9. A method comprising:
generating bitmap image data based on print data;
extracting object attribute information from objects forming the print data;
determining a compression method of the bitmap image data based on the extracted object attribute information that corresponds to the bitmap image data from among a lossless data compression method, a low image quality loss data compression method, and a high image quality loss data compression method;
compressing the bitmap image using the determined compression method;
converting the compressed bitmap image data and the extracted object attribute information into a format of a printer command to be processed by a printer; and
transmitting the converted, compressed bitmap image data and the converted object attribute information to the printer.

10. The method of claim 9, further comprising:
mapping the extracted object attribute information with the corresponding bitmap image data.

11. The method of claim 10, wherein
the mapping the extracted object attribute information with the bitmap image data includes dividing the bitmap image data into band units, and
the determining of the compression method of the bitmap image data includes determining the compression method of the bitmap image data in the band units.

12. The method of claim 10, wherein the determining of the compression method of the bitmap image data comprises determining the compression method of the bitmap image data based on a value of a pixel included in the bitmap image data.

13. The method of claim 9, wherein
the bitmap image data is data of a bitmap image, and
the extracting of the object attribute information comprises extracting the object attribute information in a pixel unit of the bitmap image and map the object attribute information in the pixel unit of the bitmap image with the bitmap image data.

14. The method of claim 9, further comprising:
compressing the extracted object attribute information via the lossless data compression method, wherein
the converting converts the compressed object attribute information into the format of the printer command to be processed by the printer, and
the transmitting transmits the converted, compressed object attribute information to the printer.

15. The method of claim 9, wherein the converting of the extracted object attribute information into the format of the printer command to be processed by the printer comprises converting the extracted object attribute information into a format of a printer command language which is to be processed by the printer.

16. A non-transitory computer-readable recording medium having embodied thereon a computer program for executing the method of claim 9.

17. A printer comprising:
a communicator configured to receive, from a host device,
compressed bitmap image data based on print data and converted into a format of a printer command to be processed by the printer, and
object attribute information extracted from objects forming the print data and converted into the format of the printer command to be processed by the printer; and
a controller configured to:
interpret the received, compressed bitmap image data and the received object attribute information to determine a decompression method of the compressed bitmap image data based on the received object attribute information from among a lossless data decompression method, a low image quality loss data decompression method, and a high image quality loss data decompression method;
decompress the compressed bitmap image data using the determined decompression method;
divide the decompressed bitmap image data and color convert the divided bitmap image data, according to the received object attribute information; and
generate the print data using the color converted bitmap image data,
wherein the printer is configured to print the generated print data.

* * * * *

UNITED STATES PATENT AND TRADEMARK OFFICE
CERTIFICATE OF CORRECTION

PATENT NO. : 9,891,875 B2  
APPLICATION NO. : 14/849766  
DATED : February 13, 2018  
INVENTOR(S) : So-hye Kim et al.

Page 1 of 1

It is certified that error appears in the above-identified patent and that said Letters Patent is hereby corrected as shown below:

In the Drawings

In FIG. 9, Reference Numeral 910, Line 3, delete "INFORATION" and insert -- INFORMATION --, therefor.

Signed and Sealed this
Twenty-fourth Day of July, 2018

Andrei Iancu
*Director of the United States Patent and Trademark Office*